United States Patent
Gruhlke et al.

(10) Patent No.: US 12,143,697 B2
(45) Date of Patent: Nov. 12, 2024

(54) SPECTRAL IMAGE CAPTURING USING INFRARED LIGHT AND COLOR LIGHT FILTERING

(71) Applicant: QUALCOMM Incorporated, San Diego, CA (US)

(72) Inventors: Russell Gruhlke, San Jose, CA (US); Edwin Chongwoo Park, San Diego, CA (US); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/119,779

(22) Filed: Dec. 11, 2020

(65) Prior Publication Data
US 2022/0191411 A1    Jun. 16, 2022

(51) Int. Cl.
| | |
|---|---|
| *H04N 23/11* | (2023.01) |
| *H04N 23/56* | (2023.01) |
| *H04N 25/13* | (2023.01) |
| *H04N 25/131* | (2023.01) |
| *H04N 25/133* | (2023.01) |

(52) U.S. Cl.
CPC ............ *H04N 23/11* (2023.01); *H04N 23/56* (2023.01); *H04N 25/131* (2023.01); *H04N 25/133* (2023.01); *H04N 25/135* (2023.01)

(58) Field of Classification Search
CPC .. H04N 5/332; H04N 5/2256; H04N 9/04553; H04N 9/04559; H04N 9/04555; H04N 23/11; H04N 23/12; H04N 23/13
USPC ....................................................... 348/164
See application file for complete search history.

(56) References Cited

U.S. PATENT DOCUMENTS

| | | | | |
|---|---|---|---|---|
| 10,359,618 | B2 * | 7/2019 | Williamson | ........... A61B 1/063 |
| 2010/0315541 | A1 * | 12/2010 | Egawa | .............. H01L 27/14685 |
| | | | | 348/294 |

(Continued)

FOREIGN PATENT DOCUMENTS

| | | |
|---|---|---|
| EP | 1818855 A2 | 8/2007 |
| JP | 2014207273 A | 10/2014 |

OTHER PUBLICATIONS

H. Sumi et al., "Next-generation Fundus Camera with Full Color Image Acquisition in 0-lx Visible Light by 1.12-micron Square Pixel, 4K, 30-fps BSI CMOS Image Sensor with Advanced NIR Multi-spectral Imaging System," 2018 IEEE Symposium on VLSI Technology, Honolulu, HI, USA, 2018, pp. 163-164 (Year: 2018).*

(Continued)

*Primary Examiner* — Joseph G Ustaris
*Assistant Examiner* — Jimmy S Lee
(74) *Attorney, Agent, or Firm* — QUALCOMM Incorporated

(57) ABSTRACT

In some aspects, a spectral image capturing device may receive, from a filter array, visible light and infrared light, wherein the filter array includes a quantity of color filters to block the infrared light and pass the visible light and a quantity of infrared filters to block the visible light and pass the infrared light. The spectral image capturing device may produce, using an image sensor that includes an array of pixel sensors, a spectral image based at least in part on the visible light and the infrared light passed by the filter array. Numerous other aspects are provided.

31 Claims, 8 Drawing Sheets

(56) References Cited

U.S. PATENT DOCUMENTS

| | | | |
|---|---|---|---|
| 2014/0240492 A1* | 8/2014 | Lee | H04N 25/135 |
| | | | 348/136 |
| 2016/0165147 A1* | 6/2016 | Nisenzon | H04N 23/90 |
| | | | 348/164 |
| 2016/0344965 A1* | 11/2016 | Grauer | H01L 27/14656 |
| 2017/0134704 A1 | 5/2017 | Otsubo et al. | |
| 2018/0270462 A1* | 9/2018 | Otsubo | G02B 5/201 |
| 2018/0332239 A1 | 11/2018 | Peterson et al. | |
| 2018/0366507 A1* | 12/2018 | Mlinar | H01L 27/14649 |
| 2019/0082519 A1 | 3/2019 | Gagne-Keats | |
| 2020/0096677 A1 | 3/2020 | Stanley et al. | |
| 2021/0066383 A1* | 3/2021 | Yen | H04N 25/705 |

OTHER PUBLICATIONS

Zach M. Beiley, Andras Pattantyus-Abraham, Erin Hanelt, Bo Chen, Andrey Kuznetsov, Naveen Kolli, Edward H. Sargent, "Design and characterization of 1.1 micron pixel image sensor with high near infrared quantum efficiency", 2017 Proc. SPIE 10100, Optical Components and Materials XIV, 101001B (Year: 2017).*

Lee J.U., UK et al., "Imaging Performance of Attenuated Phase-Shift Mask using Coherent Scattering Microscope", Proceedings of SPPIE, IEEE, US, vol. 9048, Mar. 18, 2014 (Mar. 18, 2014), 8 Pages, XP060030830, pp. 90481X-90481X, DOI: 10.1117/12. 2045877, ISBN: 978-1-62841-730-2, the whole document.

Partial International Search Report—PCT/US2021/071770—ISA/EPO—Feb. 4, 2022.

International Search Report and Written Opinion—PCT/US2021/071770—ISA/EPO—Apr. 12, 2022.

* cited by examiner

SPECTRAL IMAGE CAPTURING USING INFRARED LIGHT AND COLOR LIGHT FILTERING

FIELD OF THE DISCLOSURE

Aspects of the present disclosure generally relate to spectral image capturing and, for example, to spectral image capturing using infrared light and color light filtering.

BACKGROUND

Spectral imaging refers to imaging that uses multiple bands across the electromagnetic spectrum. While an ordinary camera may capture light across three wavelength bands in the visible spectrum, red, green, and blue (RGB), spectral imaging may encompass wide variety of techniques that go beyond RGB. For example, spectral imaging may use the infrared spectrum, the visible spectrum, the ultraviolet spectrum, and/or x-rays. Spectral imaging may include an acquisition of image data in visible and non-visible bands simultaneously, an illumination from outside a visible range, and/or the use of optical filters to capture a specific spectral range.

SUMMARY

In some aspects, a spectral image capturing device includes a filter array that includes a quantity of color filters configured to block infrared light and pass visible light and a quantity of infrared filters configured to block the visible light and pass the infrared light; and an image sensor including an array of pixel sensors configured to produce a spectral image based at least in part on one or more of the visible light and the infrared light passed by the filter array, wherein the array of pixel sensors includes: a quantity of color pixel sensors, corresponding to the quantity of color filters, configured to sense visible light passed from the quantity of color filters, and a quantity of infrared pixel sensors, corresponding to the quantity of infrared filters, configured to sense infrared light passed from the quantity of infrared filters.

In some aspects, a spectral image capturing device includes an infrared filter patch to block visible light and pass infrared light; one or more color-infrared filter patches to pass the visible light and pass the infrared light; and an image sensor to produce a spectral image based at least in part on the infrared light passed by the infrared filter patch and the one or more color-infrared filter patches and the visible light and infrared light passed by the one or more color-infrared filter patches.

In some aspects, a method for capturing spectral images includes receiving, from a filter array, visible light and infrared light, wherein the filter array includes a quantity of color filters to block the infrared light and pass the visible light and a quantity of infrared filters to block the visible light and pass the infrared light; and producing, using an image sensor that includes an array of pixel sensors, a spectral image based at least in part on the visible light and the infrared light passed by the filter array, wherein the array of pixel sensors includes: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters.

In some aspects, an apparatus includes means for receiving, from a filter array, visible light and infrared light, wherein the filter array includes a quantity of color filters to pass the visible light and a quantity of infrared filters to block the visible light and pass the infrared light; and means for producing, using an image sensor that includes an array of pixel sensors, a spectral image based at least in part on the visible light and the infrared light passed by the filter array, wherein the array of pixel sensors includes: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
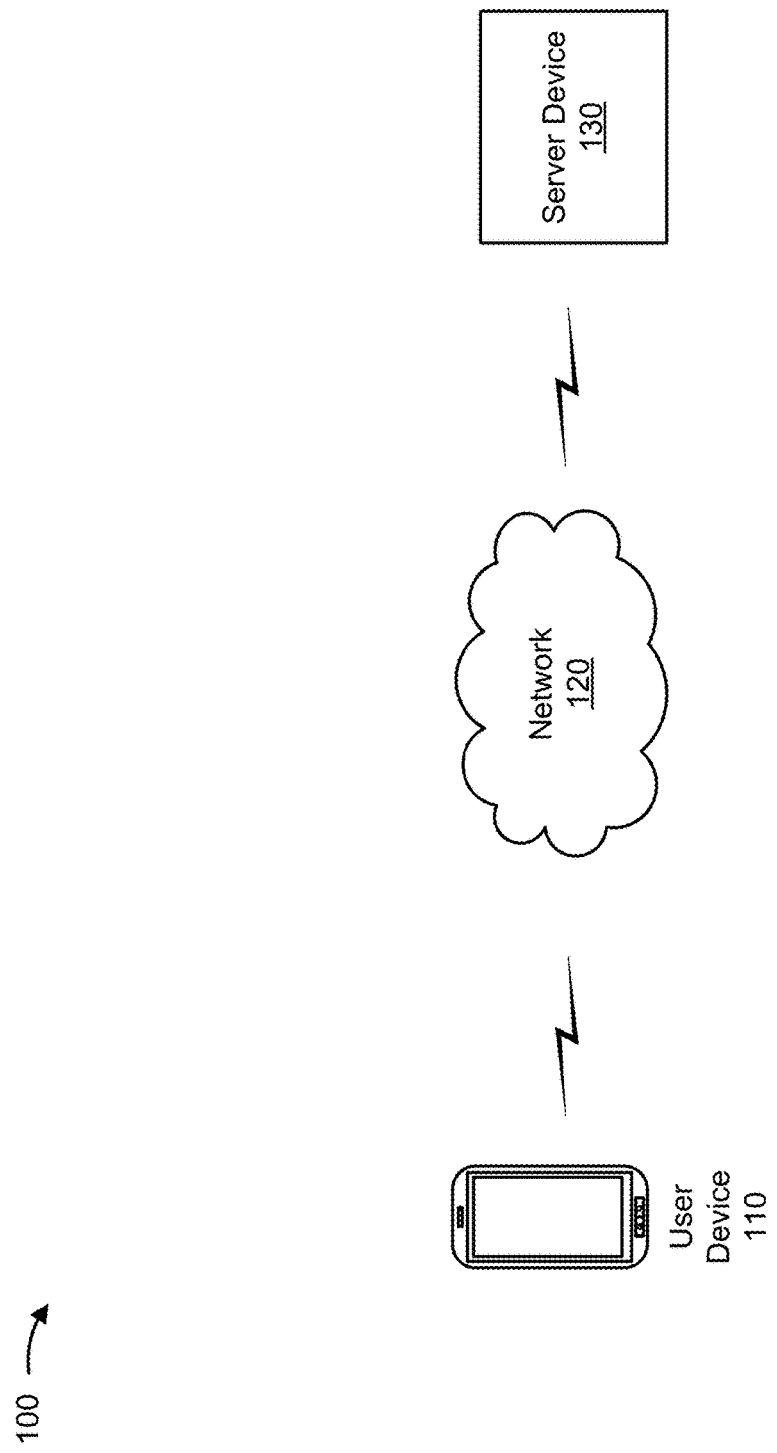
FIG. 1 is a diagram illustrating an example environment in which spectral image capturing using infrared light and color light filtering, as described herein, may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Information content imaged by a camera may be wavelength dependent, which may create an issue for certain scenes or camera applications. For example, an image captured of a scene illuminated with infrared light may be different than an image captured of the scene illuminated with visible light. In other words, for a same scene, the image may be different depending on whether the camera captures the scene using infrared light or visible light.

As an example, when capturing an image of an eye of a user, infrared light illumination may result in improved image quality as compared to visible light illumination when the eye of the user is brown. As another example, when capturing the image of the eye of the user, visible light illumination may result in improved image quality as compared to infrared light illumination when the eye of the user is blue.

In some cases, to resolve potential issues resulting from information content imaged by the camera being wavelength dependent, multiple cameras may be employed in an imaging solution. For example, the imaging solution may involve a first camera and a second camera. The first camera may include a filter to shield a sensor associated with the first camera from visible light. The second camera may include a filter to shield a sensor associated with the second camera from infrared light. However, by employing two separate cameras (e.g., a visible light camera and an infrared light camera), a cost and size of the imaging solution may be multiplied by a factor of two.

In various aspects of techniques and apparatuses described herein, a spectral image capturing camera may perform spectral image capturing using infrared light and color light filtering. The infrared light filtering may be associated with infrared light in a non-visible spectrum. The color light filtering may be associated with color light in a visible spectrum. The spectral image capturing camera may include a filter array. The filter array may include a quantity of color filters configured to block infrared light and pass visible light and a quantity of infrared filters configured to block the visible light and pass the infrared light. The spectral image capturing camera may include an image sensor including an array of pixel sensors configured to produce a spectral image based at least in part on one or more of the visible light and the infrared light passed by the filter array. The array of pixel sensors may include a quantity of color pixel sensors, corresponding to the quantity of color filters, configured to sense visible light passed from the quantity of color filters. Further, the array of pixel sensors may include a quantity of infrared pixel sensors, corresponding to the quantity of infrared filters, configured to sense infrared light passed from the quantity of infrared filters.

In various aspects of techniques and apparatuses described herein, the spectral image capturing camera may be a single camera capable of capturing multiple spectral sets of information. In other words, the spectral image capturing camera may combine separate visible light and infrared light imaging capability into a single camera. As a result, the spectral image capturing camera may occupy less space as compared to an imaging solution that employs separate cameras for visible light imaging and infrared light imaging.

FIG. 1 is a diagram of an example environment 100 in which systems and/or methods for spectral image capturing using infrared light and color light filtering, as described herein, may be implemented. As shown in FIG. 1, environment 100 may include a user device 110, a network 120, and a server device 130. Devices of environment 100 may interconnect via wired connections, wireless connections, or a combination of wired and wireless connections.

User device 110 may include one or more devices capable of receiving, generating, storing, processing, and/or providing information, such as information described herein. For example, user device 110 may include a spectral image capturing device such as a camera, a computing device (e.g., a desktop computer, a laptop computer, a tablet computer, a handheld computer, a server, and/or the like) that includes a spectral image capturing device, a mobile phone (e.g., a smart phone, a radiotelephone, and/or the like) that includes a spectral image capturing device, or a similar device that employs spectral image capturing technology, as described herein. In some implementations, user device 110 may receive information from and/or transmit information to server device 130.

Network 120 may include one or more wired and/or wireless networks. For example, network 120 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Server device 130 may include one or more devices capable of receiving, generating, storing, processing, and/or providing information, such as information described herein. For example, server device 130 may include a computing device, such as a server, a desktop computer, a laptop computer, a tablet computer, a handheld computer, or a similar device.

The number of devices and networks shown in FIG. 1 is provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, one or more of the devices of environment 100 may perform one or more functions described as being performed by another one or more devices of environment 100.

Figure 2:
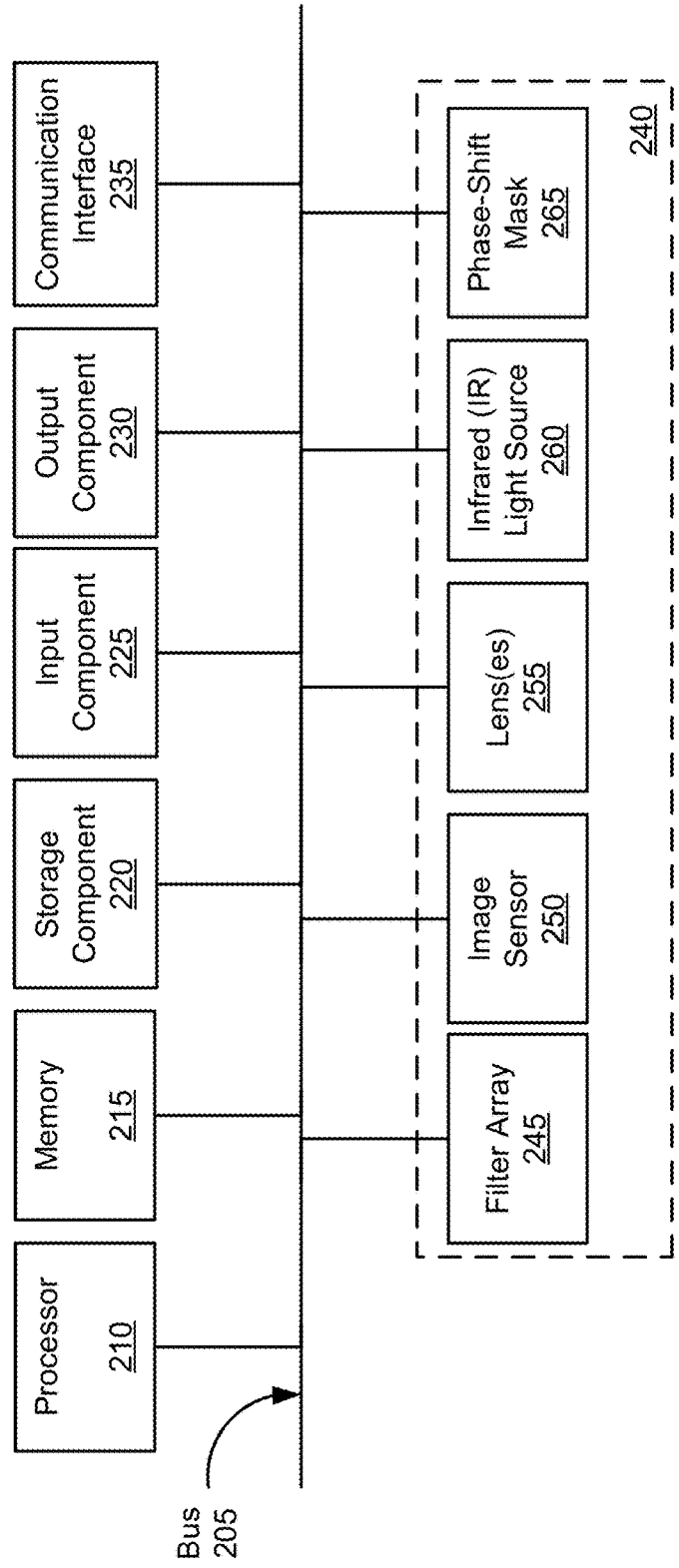
FIG. 2 is a diagram illustrating example components of one or more devices shown in FIG. 1, such as a spectral image capturing device, in accordance with various aspects of the present disclosure.

FIG. 2 is a diagram illustrating example components of a device 200, in accordance with various aspects of the present disclosure. Device 200 may correspond to user device 110, which may be a camera. In some aspects, user device 110 may include one or more devices 200 and/or one or more components of device 200. As shown in FIG. 2, device 200 may include a bus 205, a processor 210, a memory 215, a storage component 220, an input component 225, an output component 230, a communication interface 235, or a spectral image capturing device 240. The spectral image capturing device 240 may include a filter array 245, an image sensor 250, one or more lenses 255, an infrared light source 260, and a phase-shift mask 265.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

The filter array 245 may include a quantity of color filters configured to block infrared light and pass visible light and a quantity of infrared filters configured to block the visible light and pass infrared light. The image sensor 250 may include an array of pixel sensors configured to produce a spectral image based at least in part on one or more of the visible light and the infrared light passed by the filter array 245.

The array of pixel sensors may include a quantity of color pixel sensors, corresponding to the quantity of color filters, configured to sense visible light passed from the quantity of color filters. The array of pixel sensors may include a quantity of infrared pixel sensors, corresponding to the quantity of infrared filters, configured to sense infrared light passed from the quantity of infrared filters. The quantity of color filters may be greater than the quantity of infrared filters, or alternatively, the quantity of color filters is less than the quantity of infrared filters. The quantity of color filters may include one or more red light filters, one or more green light filters, and/or one or more blue light filters. The quantity of infrared filters may be equal to one.

The spectral image may include a first spectral image or a second spectral image, where the first spectral image may be produced based at least in part on the quantity of color pixel sensors and the second spectral image may be produced based at least in part on the quantity of infrared pixel sensors.

The image sensor 250 may be configured to produce the spectral image based at least in part on the quantity of color pixel sensors when the quantity of infrared pixel sensors are not used. The image sensor 250 may be configured to produce the spectral image based at least in part on the quantity of infrared pixel sensors when the quantity of color pixel sensors are not used.

The one or more lenses 255 may be configured to direct the visible light and the infrared light to the filter array 245. The infrared light source 260 may be configured to produce the infrared light. The phase-shift mask 265 may be coupled to the filter array 245 and/or the image sensor 250. The spectral image may be produced based at least in part on the phase-shift mask 265.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving, from a filter array, visible light and infrared light, wherein the filter array includes a quantity of color filters to block the infrared light and pass the visible light and a quantity of infrared filters to block the visible light and pass the infrared light; and/or means for producing, using an image sensor that includes an array of pixel sensors, a spectral image based at least in part on the visible light and the infrared light passed by the filter array, wherein the array of pixel sensors includes: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters. In some aspects, such means may include one or more components of device 200 described in connection with FIG. 2, such as bus 205, processor 210, memory 215, storage component 220, input component 225, output component 230, communication interface 235, and/or a spectral image capturing device 240, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

In an optical system with infrared light illumination, a point source of infrared light may be imaged to a relatively large, diffraction induced blurry spot, irrespective of a condition of a camera lens of the optical system. The blurry spot may be an undesirable result of using infrared light illumination. The blurry spot may have a diameter based at least in part on an f-number associated with the camera lens and a wavelength associated with the infrared light. The f-number of the camera lens is a ratio between a focal length associated with the camera lens and a lens aperture diameter of the camera lens. The diameter of the blurry spot may be the f-number multiplied by the wavelength.

Figure 3:
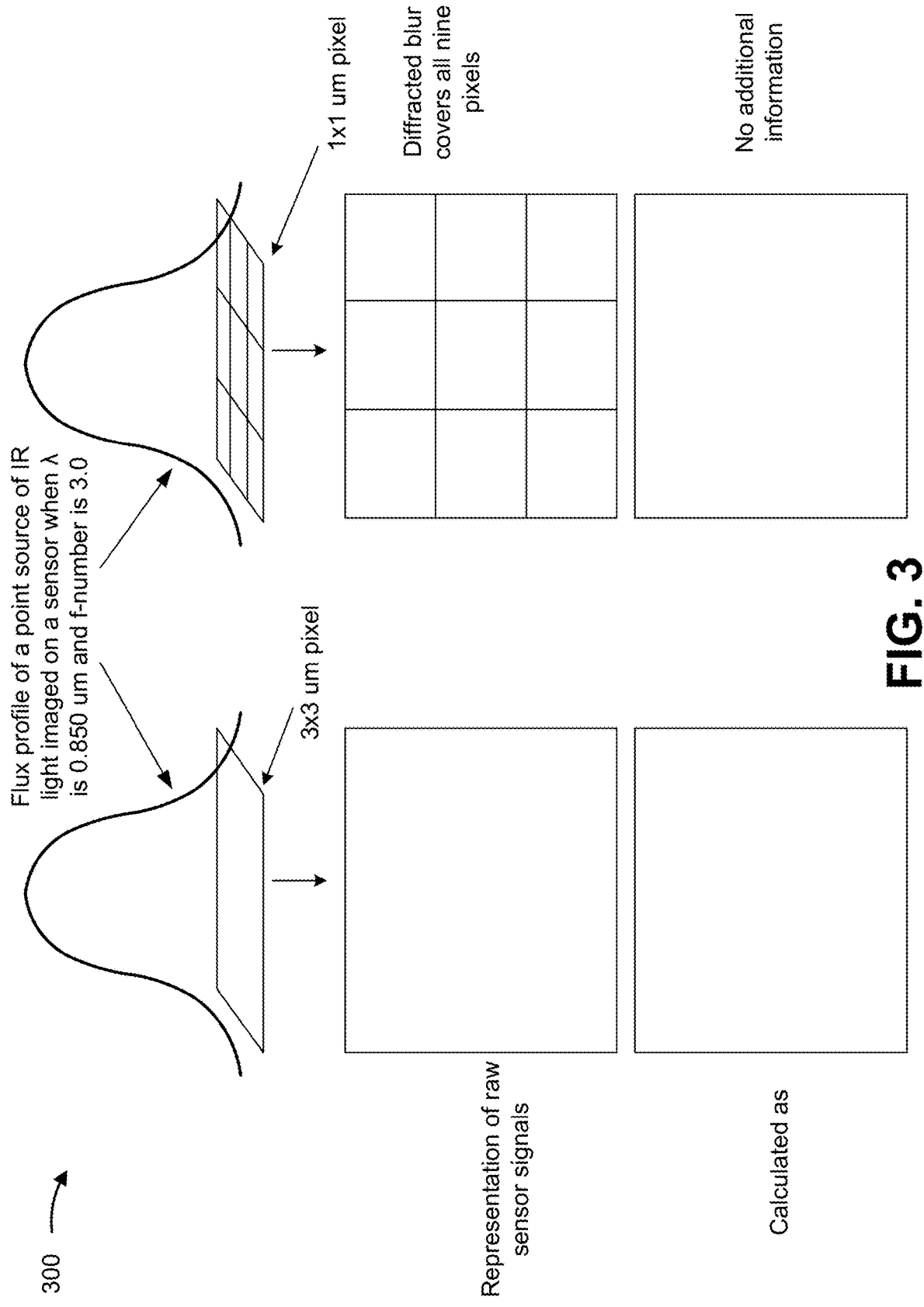
FIG. 3 is a diagram illustrating an example associated with infrared light illumination, in accordance with various aspects of the present disclosure.

FIG. 3 is a diagram illustrating an example 300 of infrared light illumination, in accordance with various aspects of the present disclosure.

In the example shown in FIG. 3, an f-number of a camera lens for a small format camera, such as an eye tracking camera, may be equal to three. A wavelength for an infrared point source may be equal to 0.850 microns. A diameter of a blurry spot may be approximately 2-3 microns when the f-number is equal to three and the wavelength is 0.850 microns.

A point source of infrared light may be imaged on a sensor of a camera. In one example, a single 3-by-3 micron sensor pixel array may be employed, and a representation of raw sensor signals may be derived based at least in part on the 3-by-3 micron sensor pixel array. In another example, a 3-by-3 micron sensor pixel array may be employed, where each pixel size may be equal to 1-by-1 microns. In other words, the 3-by-3 micron sensor pixel array may include nine separate 1-by-1 micron pixels. When the diameter of the blurry spot is approximately 2-3 microns based at least in part on the wavelength of 0.850 microns and the f-number equal to three, the blurry spot may cover (at least partially) all nine 1-by-1 micron pixels. As a result, the 3-by-3 micron sensor pixel array, where each pixel size is equal to 1-by-1 microns, may roughly yield a same amount of imaging information as the single 3-by-3 micron sensor pixel array. In other words, a reduced pixel size (e.g., a 1-by-1 micron pixel versus a 3-by-3 micron pixel) may be ineffective for infrared light. Further, decreasing a pixel area (e.g., by a factor of ⅑) may not improve an imaging performance for infrared light illumination.

As indicated above, FIG. 3 is provided as an example. Other examples may differ from what is described with regard to FIG. 3.

Figure 4:
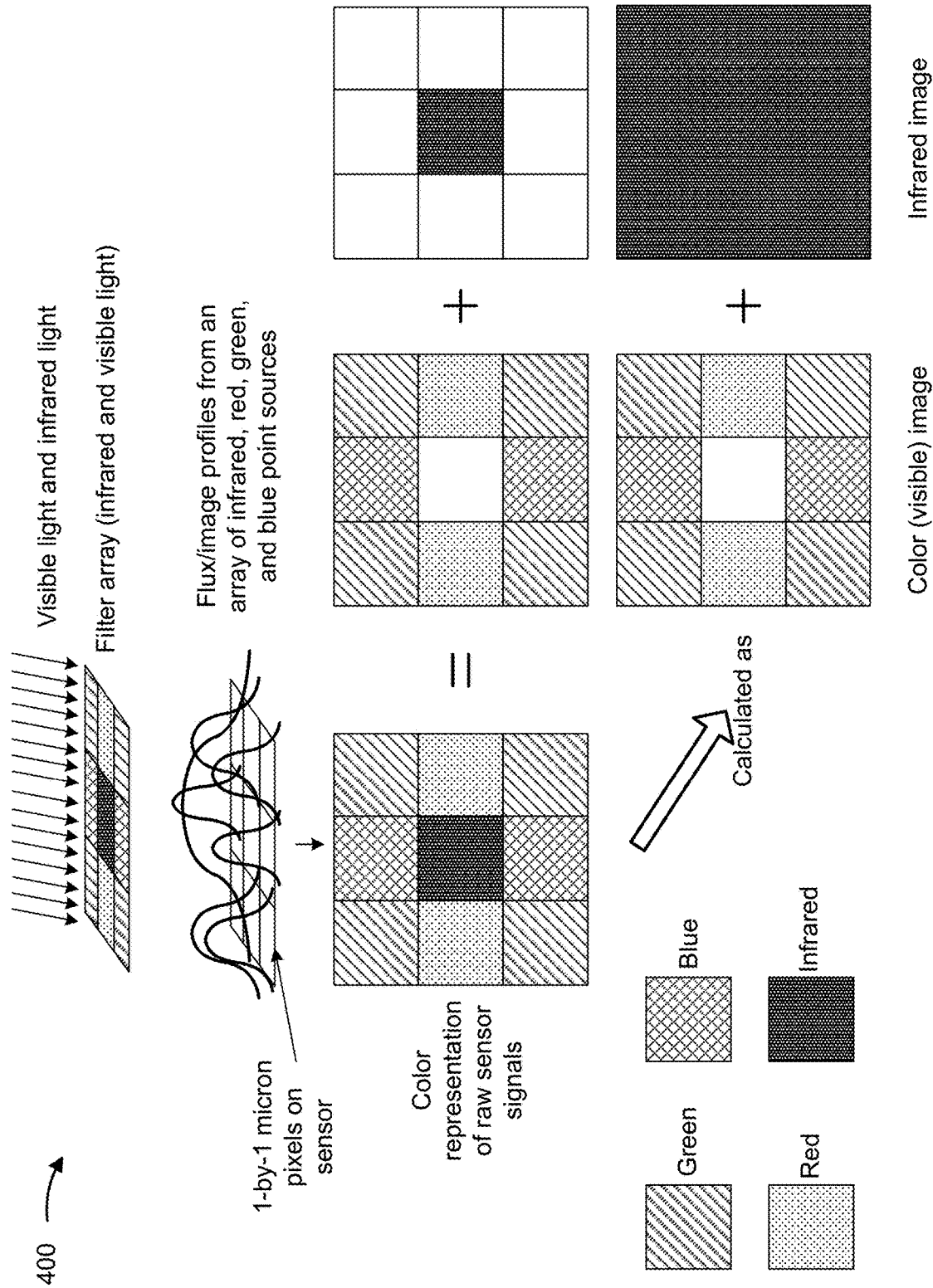
FIGS. 4-7 are diagrams illustrating examples associated with spectral image capturing using infrared light and color light filtering, in accordance with various aspects of the present disclosure.

FIG. 4 is a diagram illustrating an example 400 of spectral image capturing using infrared light and color light filtering, in accordance with various aspects of the present disclosure.

In some aspects, a spectral image capturing device (e.g., spectral image capturing device 240) may include an infrared light source to produce infrared light. The spectral image capturing device may include one or more lenses to direct visible light and the infrared light to a filter array in the spectral image capturing device. Visible light may refer to color light, such as red light, green light, or blue light. The filter array may include a quantity of color filters configured to block infrared light and pass visible light. The color filters may also be referred to as visible light filters. The filter array may include a quantity of infrared filters configured to block the visible light and pass the infrared light. The spectral image capturing device may include an image sensor. The image sensor may include an array of pixel sensors configured to produce a spectral image based at least in part on the visible light and/or the infrared light passed by the filter array.

In some aspects, the array of pixel sensors may include a quantity of color pixel sensors, corresponding to the quantity of color filters, configured to sense visible light passed from the quantity of color filters. The quantity of color filters may include one or more red light filters, one or more green light filters, and/or one or more blue light filters. The color pixel sensors may also be referred to as visible light pixel sensors. The array of pixel sensors may include a quantity of infrared pixel sensors, corresponding to the quantity of infrared filters, configured to sense infrared light passed from the quantity of infrared filters. The quantity of color filters may be greater than the quantity of infrared filters. In a specific example, the quantity of infrared filters may be equal to one, and the quantity of color filters may be greater than one.

In some aspects, the spectral image may include a first spectral image and/or a second spectral image. The first spectral image may be produced based at least in part on the quantity of color pixel sensors, and the second spectral image may be produced based at least in part on the quantity of infrared pixel sensors.

In the example shown in FIG. 4, visible light such as incident visible light and infrared light may be focused by a lens of a spectral image capturing device. The visible light may be color light, such as red light, green light, and/or blue light. The visible light and the infrared light may strike a filter array, where the filter array may be associated with an array of pixel sensors. An image or flux profile may be associated with an array of red light, green light, blue light, and infrared light point sources, which may be focused on the array of pixel sensors by the lens of the spectral image capturing device. The image or flux profile may be broader for a longer light wavelength due to diffraction as the light (e.g., red, green, blue, or infrared light) passes through the lens and is focused onto the array of pixel sensors.

In some aspects, the array of pixel sensors may be an n-by-n grid of pixel sensors, where n may be any positive value greater than one, and a first portion of the n-by-n pixel sensors may correspond to color pixel sensors and a remaining portion of the n-by-n pixel sensors may correspond to infrared filters.

In the example shown in FIG. 4, the array of pixel sensors may be a 3-by-3 grid of pixel sensors consisting of nine individual pixel sensors. One pixel sensor may sense a 1-by-1 micron pixel. In this example, eight of the nine pixel sensors may be color pixel sensors. The eight of the nine pixel sensors may each be covered by a color filter, which may pass visible light and block infrared light. Visible light may be red light, green light, and/or blue light. The ninth pixel sensor in the 3-by-3 grid of pixel sensors may be an infrared pixel sensor. The infrared pixel sensor may be covered by an infrared filter, which may block out the visible light but pass the infrared light. The color filters and the infrared filter may form the filter array associated with the array of pixel sensors.

In the example shown in FIG. 4, the eight of the nine pixel sensors may be used to sense visible light and the ninth pixel sensor may be used to sense infrared light. Since eight of the nine pixel sensors are used for visible light (or color light) imaging, a spatial imaging resolution may be slightly less as compared to if all nine pixel sensors were used for visible light imaging. However, since a typical diameter of a blurry spot due to infrared light illumination is approximately 2-3 microns, the blurry spot on the array of pixel sensors may be approximately 3-by-3 microns. As a result, an effective infrared pixel sensor resolution may be similar to using all nine pixel sensors to sense infrared light. One difference may be a reduction in infrared light flux sensed by the single infrared pixel sensor, but the reduction in the infrared light flux may be compensated for by increasing a pixel gain.

In the example shown in FIG. 4, a visible light image may be determined based at least in part on the eight of the nine pixel sensors used to sense visible light, and an infrared light image may be determined based at least in part on the ninth pixel sensor used to sense infrared light. The visible light image and the infrared light image may be superimposed spectral images. The infrared light image, although determined using one of the nine pixel sensors, may have an effective infrared pixel sensor resolution similar to if the infrared light image was determined using all nine pixel sensors.

In the example shown in FIG. 4, by using the eight of the nine pixel sensors to sense visible light and the ninth pixel sensor to sense infrared light, both visible light and infrared light imaging may be supported by a single camera. In other words, a single camera may provide both visible light and infrared light imaging capability, without having two separate cameras for detecting visible light and infrared light. While using a single camera to perform both visible light and infrared light imaging, a reduction in spatial image resolution may result, but the reduction may be negligible for certain camera applications such as eye tracking.

In some aspects, the image sensor may produce the spectral image based at least in part on the quantity of color pixel sensors and not the quantity of infrared pixel sensors. Alternatively, the image sensor may produce the spectral image based at least in part on the quantity of infrared pixel sensors and not the quantity of color pixel sensors.

For example, when a brown eye is to be imaged, and an infrared light illumination of the brown eye may provide a better imaging resolution than a color light illumination of the brown eye, infrared pixel sensors collecting infrared light may be used and color pixel sensors collecting visible light may not be used. In other words, color light sensing pixels may not be read out, which may save power consumption and yield similar imaging results as if the color light sensing pixels were used.

As indicated above, FIG. 4 is provided as an example. Other examples may differ from what is described with regard to FIG. 4.

Figure 5:
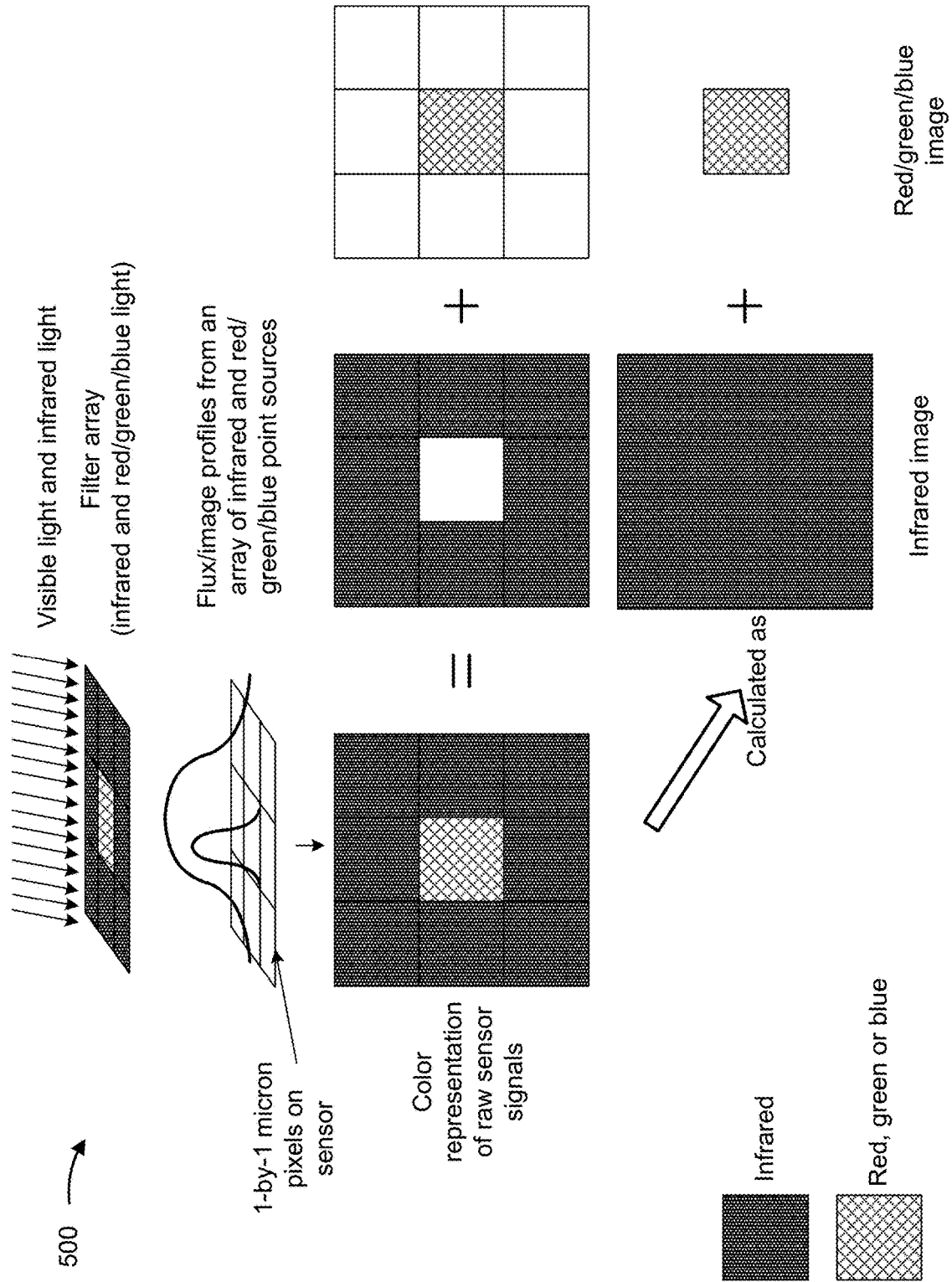

FIG. 5 is a diagram illustrating an example 500 of spectral image capturing using infrared light and color light filtering, in accordance with various aspects of the present disclosure.

In the example shown in FIG. 5, visible light such as incident visible light and infrared light may be focused by a lens of a spectral image capturing device. The visible light may be color light, such as red light, green light, or blue light. The visible light and the infrared light may strike a filter array, where the filter array may be associated with an array of pixel sensors. An image or flux profile may be associated with an array of red light, green light or blue light, and infrared light point sources, which may be focused on the array of pixel sensors by the lens of the spectral image capturing device.

In the example shown in FIG. 5, the array of pixel sensors may be a 3-by-3 micron grid of pixel sensors consisting of nine individual pixel sensors. One pixel sensor may sense a 1-by-1 micron pixel. In this example, eight of the nine pixel sensors may be infrared pixel sensors. The eight of the nine pixel sensors may each be covered by an infrared filter, which may block out the visible light but pass the infrared light. The ninth pixel sensor in the 3-by-3 micron grid of pixel sensors may be a color pixel sensor. The color pixel sensor may be covered by a color filter, which may pass visible light and block infrared light. The color filter may be a red light filter, a green light filter, or a blue light filter. In this example, a quantity of color filters may be less than a quantity of infrared filters. The infrared filters and the color filter may form the filter array associated with the array of pixel sensors.

In the example shown in FIG. 5, an infrared light image may be determined based at least in part on the eight of the nine pixel sensors used to sense infrared light, and a color light image may be determined based at least in part on the ninth pixel sensor used to sense color light. The infrared light image and the color light image may be superimposed spectral images.

In some aspects, a quantity of infrared pixel sensors may be increased in the array of pixel sensors until one color pixel sensor remains in the array of pixel sensors. In other words, the spectral image capturing device may primarily be an infrared imaging camera but may possess some level of visible light imaging capability as well. The spectral image capturing device may have a reduced color pixel sensor resolution, especially when using one color pixel sensor in the array of pixel sensors. However, the color pixel sensor resolution may be sufficient for certain applications, such as computer vision applications or eye tracking applications. Further, a reduced spatial imaging resolution may be an acceptable tradeoff to achieve multi-spectral imaging in the spectral image capturing device.

In some aspects, a spatial positioning of differing color filter patches may vary depending on the application. For example, since infrared light may have a relatively large diffractive blurry spot, a number of infrared filters that pass infrared light and block visible light may be reduced and spaced further apart. Further, blue light may have a smaller diffraction blur as compared to red light and green light, so a number of blue light filters may be increased. Depending on the application, a number or spacing of filters (e.g., infrared filters or color filters) may vary to optimize the spatial imaging resolution.

As indicated above, FIG. 5 is provided as an example. Other examples may differ from what is described with regard to FIG. 5.

Figure 6:
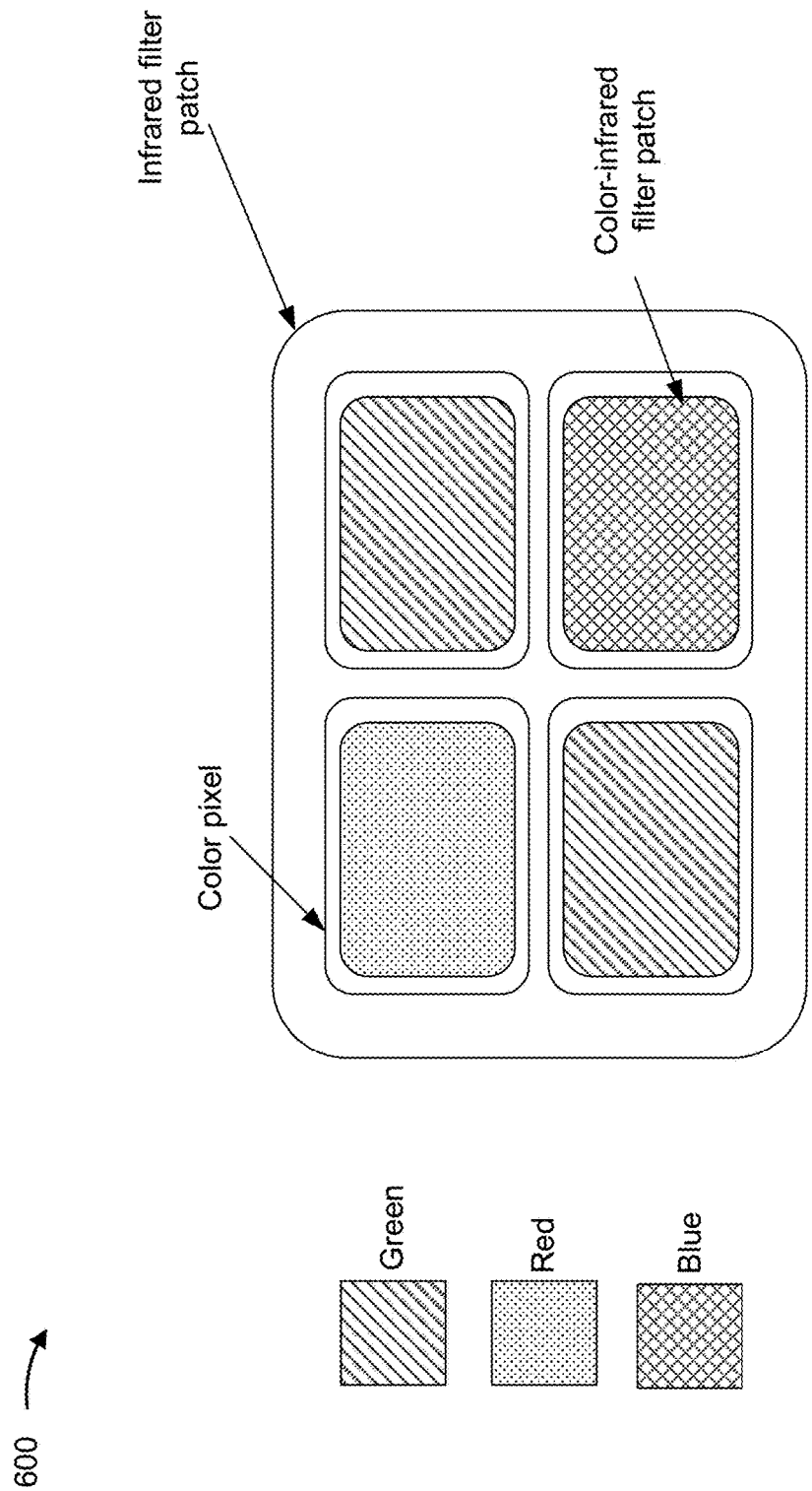

FIG. 6 is a diagram illustrating an example 600 of spectral image capturing using infrared light and color light filtering, in accordance with various aspects of the present disclosure.

In some aspects, a spectral image capturing device (e.g., spectral image capturing device 240) may include an infrared filter patch to block visible light and pass infrared light. The spectral image capturing device may include one or more color-infrared filter patches to pass the visible light and pass the infrared light. The spectral image capturing device may include one or more lenses to direct the visible light to the one or more color-infrared filter patches and to direct the infrared light to the one or more color-infrared filter patches and the infrared filter patch.

In some aspects, the spectral image capturing device may include an image sensor to produce a spectral image based at least in part on the infrared light passed by the infrared filter patch and the one or more color-infrared filter patches, and the visible light and infrared light passed by the one or more color-infrared filter patches. The spectral image may correspond to the infrared filter patch and/or the one or more color-infrared filter patches. In other words, a spectral image corresponding to the infrared filter patch and a spectral image corresponding to the one or more color-infrared filter patches may be superimposed spectral images.

In some aspects, at least one of the one or more color-infrared filter patches may pass red light and the infrared light and block blue light and green light. In some aspects, at least one of the one or more color-infrared filter patches may pass green light and the infrared light and block red light and blue light. In some aspects, at least one of the one or more color-infrared filter patches may pass blue light and the infrared light and block red light and green light.

In the example shown in FIG. 6, an image sensor of a spectral image capturing device may include color-infrared filter patches that pass infrared light, as well as either red light, green light or blue light. The filter patches may correspond to red, green, and/or blue pixels. The filter patches may be overlays on a larger infrared pixel. The larger infrared pixel may effectively contain the red, green, and/or blue pixels associated with the color-infrared filter patches. In some cases, light associated with longer wavelengths may penetrate further into the image sensor, so different depths of the image sensor may detect different wavelengths. At a portion of the image sensor (e.g., a bottom portion of the image sensor), infrared light may remain and color light would not remain. In this example, the larger infrared pixel may not suffer from a reduction in spatial imaging resolution, since infrared light may have a relatively large diffractive blur.

As indicated above, FIG. 6 is provided as an example. Other examples may differ from what is described with regard to FIG. 6.

Figure 7:
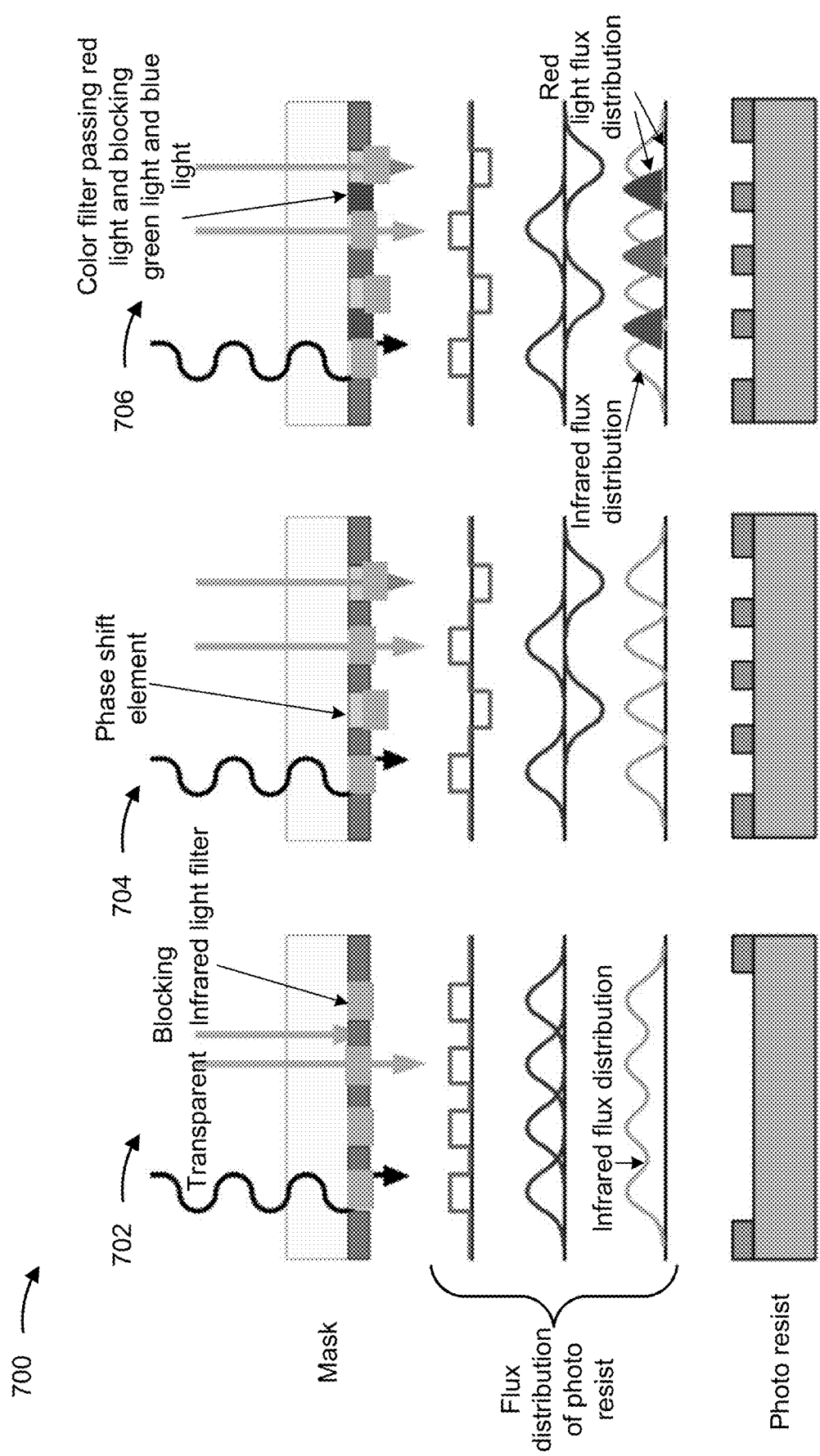

FIG. 7 is a diagram illustrating an example 700 of spectral image capturing using infrared light and color light filtering, in accordance with various aspects of the present disclosure.

In some aspects, a spectral image capturing device (e.g., spectral image capturing device 240) may include a phase-shift mask. The phase-shift mask may be coupled to a filter array and/or an image sensor in the spectral image capturing device. The spectral image capturing device may produce a spectral image based at least in part on the phase-shift mask.

Phase-shift masks may improve a spatial imaging resolution of the spectral image. Phase-shift masks may be applicable to multi-spectral imaging, since phase-shift masks are wavelength dependent and operate by manipulating a phase of incident light.

As shown by reference numbers 702, 704 and 706, a phase-shift mask may be placed over a photo resist. The phase-shift mask may include an infrared light filter that passes infrared light and blocks visible light (or color light), a phase shift element, and/or a visible light filter that passes one color light and blocks other color lights. For example, the visible light filter may pass red light and block green light and blue light. The visible light filter may block the infrared light. The phase-shift mask may include areas that are transparent and allow infrared light and/or visible light to pass, as well as areas that block infrared light and/or visible light.

As further shown by reference numbers 702, 704 and 706, a flux distribution of the photo resist may be calculated based at least in part on the infrared light and/or visible light that is passed through the phase-shift mask. The flux distribution may include an infrared light flux distribution and/or a color light flux distribution (e.g., a red light flux distribution, a green light flux distribution, and/or a blue light flux distribution). The flux distribution may be associated with a phase, an intensity, and/or an amplitude of the infrared and/or visible light waves.

As further shown by reference numbers 702, 704 and 706, portions of the photo resist that have been exposed to the infrared light and/or the visible light may be removed, and portions of the photo resist that have not been exposed to the infrared light and/or the visible light may remain. In other words, a pattern associated with the photo resist may be based at least in part on the transparent areas of the phase-shift mask and the light blocking areas of the phase-shift mask. In some aspects, a spatial imaging resolution may be based at least in part on a distance between remaining portions of the photo resist.

As indicated above, FIG. 7 is provided as an example. Other examples may differ from what is described with regard to FIG. 7.

Figure 8:
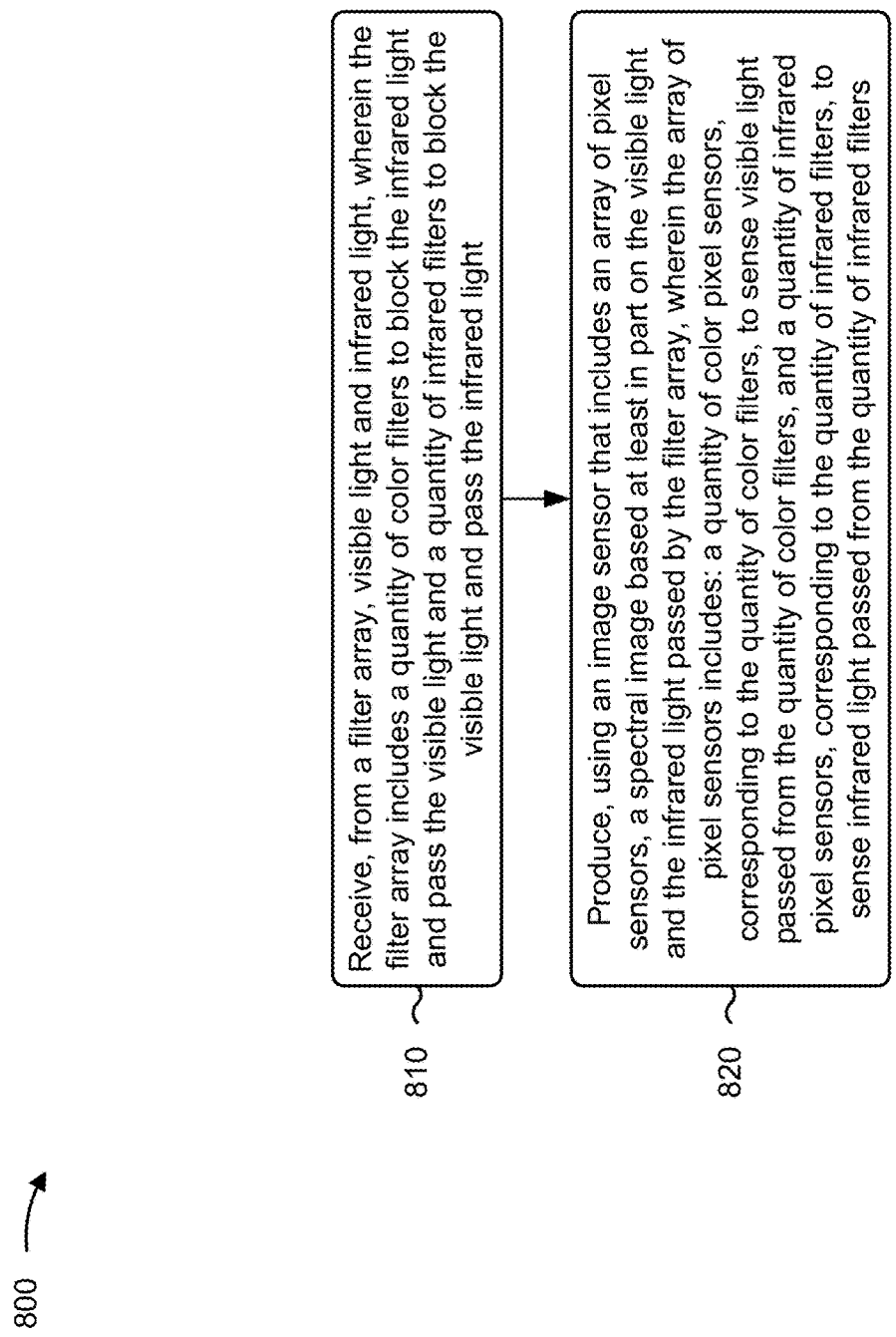
FIG. 8 is a flowchart of an example process associated with spectral image capturing using infrared light and color light filtering, in accordance with various aspects of the present disclosure.

FIG. 8 is a flowchart of an example process 800 associated with spectral image capturing using infrared light and color light filtering. In some implementations, one or more process blocks of FIG. 8 may be performed by a spectral image capturing device (e.g., spectral image capturing device 240). In some implementations, one or more process blocks of FIG. 8 may be performed by another device or a group of devices separate from or including the spectral image capturing device, such as user device 110. Additionally, or alternatively, one or more process blocks of FIG. 8 may be performed by one or more components of device 200, such as processor 210, memory 215, storage component 220, input component 225, output component 230, and/or communication interface 235.

As shown in FIG. 8, process 800 may include receiving, from a filter array, visible light and infrared light (block 810). For example, the filter array may include a quantity of color filters to block the infrared light and pass the visible light and a quantity of infrared filters to block the visible light and pass the infrared light, as described above.

As further shown in FIG. 8, process 800 may include producing, using an image sensor that includes an array of pixel sensors, a spectral image based at least in part on the visible light and the infrared light passed by the filter array (block 820). For example, the array of pixel sensors may include: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters, as described above.

Process 800 may include additional implementations, such as any single implementation or any combination of implementations described below and/or in connection with one or more other processes described elsewhere herein.

In a first implementation, the spectral image is a first spectral image or a second spectral image, wherein the first spectral image is produced based at least in part on the quantity of color pixel sensors and the second spectral image is produced based at least in part on the quantity of infrared pixel sensors.

In a second implementation, alone or in combination with one or more of the first and second implementations, process 800 includes excluding the quantity of infrared pixel sensors; and producing the spectral image comprises producing the spectral image based at least in part on the quantity of color pixel sensors.

In a third implementation, alone or in combination with one or more of the first and second implementations, process 800 includes excluding the quantity of color pixel sensors; and producing the spectral image comprises producing the spectral image based at least in part on the quantity of infrared pixel sensors.

In a fourth implementation, alone or in combination with one or more of the first and second implementations, process 800 includes directing the visible light and the infrared light to the filter array using one or more lenses.

In a fifth implementation, alone or in combination with one or more of the first and second implementations, process 800 includes producing the infrared light using an infrared light source.

In a sixth implementation, alone or in combination with one or more of the first and second implementations, producing the spectral image comprises producing the spectral image based at least in part on a phase-shift mask coupled to one or more of the filter array or the image sensor.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The following provides an overview of aspects of the present disclosure:

Aspect 1: A spectral image capturing device, comprising: a filter array including a quantity of color filters configured to block infrared light and pass visible light and a quantity of infrared filters configured to block the visible light and pass the infrared light; and an image sensor including an array of pixel sensors configured to produce a spectral image based at least in part on one or more of the visible light and the infrared light passed by the filter array, wherein the array of pixel sensors includes: a quantity of color pixel sensors, corresponding to the quantity of color filters, configured to sense visible light passed from the quantity of color filters, and a quantity of infrared pixel sensors, corresponding to the quantity of infrared filters, configured to sense infrared light passed from the quantity of infrared filters.

Aspect 2: The spectral image capturing device of aspect 1, wherein the quantity of color filters is greater than the quantity of infrared filters.

Aspect 3: The spectral image capturing device of any of aspects 1 to 2, wherein the quantity of color filters is less than the quantity of infrared filters.

Aspect 4: The spectral image capturing device of any of aspects 1 to 3, wherein the quantity of color filters includes one or more of: one or more red light filters, one or more green light filters, or one or more blue light filters.

Aspect 5: The spectral image capturing device of any of aspects 1 to 4, wherein the quantity of infrared filters is equal to one.

Aspect 6: The spectral image capturing device of any of aspects 1 to 5, wherein the spectral image is a first spectral image or a second spectral image, wherein the first spectral image is produced based at least in part on the quantity of color pixel sensors and the second spectral image is produced based at least in part on the quantity of infrared pixel sensors.

Aspect 7: The spectral image capturing device of any of aspects 1 to 6, wherein the image sensor is configured to produce the spectral image based at least in part on the quantity of color pixel sensors when the quantity of infrared pixel sensors are not used.

Aspect 8: The spectral image capturing device of any of aspects 1 to 7, wherein the image sensor is configured to produce the spectral image based at least in part on the quantity of infrared pixel sensors when the quantity of color pixel sensors are not used.

Aspect 9: The spectral image capturing device of any of aspects 1 to 8, further comprising: one or more lenses configured to direct the visible light and the infrared light to the filter array.

Aspect 10: The spectral image capturing device of any of aspects 1 to 9, further comprising: an infrared light source configured to produce the infrared light.

Aspect 11: The spectral image capturing device of any of aspects 1 to 10, further comprising: a phase-shift mask coupled to one or more of the filter array or the image sensor, wherein the spectral image is produced based at least in part on the phase-shift mask.

Aspect 12: A spectral image capturing device, comprising: an infrared filter patch to block visible light and pass infrared light; one or more color-infrared filter patches to pass the visible light and pass the infrared light; and an image sensor to produce a spectral image based at least in part on the infrared light passed by the infrared filter patch and the one or more color-infrared filter patches, and the visible light and the infrared light passed by the one or more color-infrared filter patches.

Aspect 13: The spectral image capturing device of aspect 12, wherein at least one of the one or more color-infrared filter patches is configured to pass red light and the infrared light, and block blue light and green light.

Aspect 14: The spectral image capturing device of any of aspects 12 to 13, wherein at least one of the one or more color-infrared filter patches is configured to pass green light and the infrared light, and block red light and blue light.

Aspect 15: The spectral image capturing device of any of aspects 12 to 14, wherein at least one of the one or more color-infrared filter patches is configured to pass blue light and the infrared light, and block red light and green light.

Aspect 16: The spectral image capturing device of any of aspects 12 to 15, wherein the spectral image corresponds to one or more of the infrared filter patch or the one or more color-infrared filter patches.

Aspect 17: The spectral image capturing device of any of aspects 12 to 16, further comprising: one or more lenses to direct the visible light to the one or more color-infrared filter patches and to direct the infrared light to the one or more color-infrared filter patches and the infrared filter patch.

Aspect 18: A method for capturing spectral images, comprising: receiving, from a filter array, visible light and infrared light, wherein the filter array includes a quantity of color filters to block the infrared light and pass the visible light and a quantity of infrared filters to block the visible light and pass the infrared light; and producing, using an image sensor that includes an array of pixel sensors, a spectral image based at least in part on the visible light and the infrared light passed by the filter array, wherein the array of pixel sensors includes: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters.

Aspect 19: The method of aspect 18, wherein the spectral image is a first spectral image or a second spectral image, wherein the first spectral image is produced based at least in part on the quantity of color pixel sensors and the second spectral image is produced based at least in part on the quantity of infrared pixel sensors.

Aspect 20: The method of any of aspects 18 to 19, further comprising: excluding the quantity of infrared pixel sensors; and producing the spectral image comprises producing the spectral image based at least in part on the quantity of color pixel sensors.

Aspect 21: The method of any of aspects 18 to 20, further comprising: excluding the quantity of color pixel sensors; and producing the spectral image comprises producing the spectral image based at least in part on the quantity of infrared pixel sensors.

Aspect 22: The method of any of aspects 18 to 21, further comprising: directing the visible light and the infrared light to the filter array using one or more lenses.

Aspect 23: The method of any of aspects 18 to 22, further comprising: producing the infrared light using an infrared light source.

Aspect 24: The method of any of aspects 18 to 23, wherein producing the spectral image comprises producing the spectral image based at least in part on a phase-shift mask coupled to one or more of the filter array or the image sensor.

Aspect 25: An apparatus, comprising: means for receiving, from a filter array, visible light and infrared light, wherein the filter array includes a quantity of color filters to pass the visible light and a quantity of infrared filters to block the visible light and pass the infrared light; and means for producing, using an image sensor that includes an array of pixel sensors, a spectral image based at least in part on the visible light and the infrared light passed by the filter array, wherein the array of pixel sensors includes: a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters.

Aspect 26: The apparatus of claim 25, further comprising: means for excluding the quantity of infrared pixel sensors; and means for producing the spectral image comprises producing the spectral image based at least in part on the quantity of color pixel sensors.

Aspect 27: The apparatus of any of aspects 25 to 26, further comprising: means for excluding the quantity of color pixel sensors; and means for producing the spectral image comprises producing the spectral image based at least in part on the quantity of infrared pixel sensors.

Aspect 28: The apparatus of any of aspects 25 to 27, further comprising: means for directing the visible light and the infrared light to the filter array using one or more lenses.

Aspect 29: The apparatus of any of aspects 25 to 28, further comprising: means for producing the infrared light using an infrared light source.

Aspect 30: The apparatus of any of aspects 25 to 29, wherein the means for producing the spectral image comprises means for producing the spectral image based at least in part on a phase-shift mask coupled to one or more of the filter array or the image sensor.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A spectral image capturing device, comprising:
a filter array including a quantity of color filters configured to block infrared light and pass visible light and a quantity of infrared filters configured to block the visible light and pass the infrared light,
wherein the quantity of infrared filters is an eighth of the quantity of color filters; and
an image sensor including a single array of pixel sensors and configured to produce a spectral image based at least in part on one or more of the visible light and the infrared light passed by the filter array,
wherein the single array of pixel sensors is approximately 3-by-3 microns,
wherein the single array of pixel sensors includes:
a single infrared pixel sensor configured to sense infrared light passed from the quantity of infrared filters, and
a quantity of color pixel sensors configured to sense visible light passed from the quantity of color filters, and
wherein the single infrared pixel sensor is approximately 1-by-1 microns.

2. The spectral image capturing device of claim 1, wherein the quantity of color filters includes one or more of:
one or more red light filters,
one or more green light filters, or
one or more blue light filters.

3. The spectral image capturing device of claim 1, wherein the quantity of infrared filters is equal to one.

4. The spectral image capturing device of claim 1, wherein the spectral image is a first spectral image or a second spectral image,
wherein the first spectral image is produced based at least in part on the quantity of color pixel sensors, and
wherein the second spectral image is produced based at least in part on the single infrared pixel sensor.

5. The spectral image capturing device of claim 1, wherein the image sensor is configured to produce the spectral image based at least in part on the quantity of color pixel sensors when the single infrared pixel sensor is not used.

6. The spectral image capturing device of claim 1, wherein the image sensor is configured to produce the spectral image based at least in part on the single infrared pixel sensor when the quantity of color pixel sensors are not used.

7. The spectral image capturing device of claim 1, further comprising:
one or more lenses configured to direct the visible light and the infrared light to the filter array.

8. The spectral image capturing device of claim 1, further comprising:
an infrared light source configured to produce the infrared light.

9. The spectral image capturing device of claim 1, further comprising:
a phase-shift mask coupled to one or more of the filter array or the image sensor, wherein the spectral image is produced based at least in part on the phase-shift mask.

10. A method for capturing spectral images, comprising:
receiving, from a filter array, visible light and infrared light,
wherein the filter array includes a quantity of color filters to block the infrared light and pass the visible light and a quantity of infrared filters to block the visible light and pass the infrared light, and
wherein the quantity of infrared filters is less than an eighth of a total of the quantity of infrared filters and the quantity of color filters; and
producing, using an image sensor that includes an array of pixel sensors, a spectral image based at least in part on the visible light and the infrared light passed by the filter array,
wherein the array of pixel sensors is approximately 3-by-3 microns,
wherein the array of pixel sensors includes:
a quantity of color pixel sensors, corresponding to the quantity of color filters, to sense visible light passed from the quantity of color filters, and
a single infrared pixel sensor, corresponding to the quantity of infrared filters, to sense infrared light passed from the quantity of infrared filters, and
wherein the single infrared pixel sensor is approximately 1-by-1 microns.

11. The method of claim 10, wherein the spectral image is produced based at least in part on the quantity of color pixel sensors.

12. The method of claim 10, further comprising:
excluding the single infrared pixel sensor; and
producing the spectral image comprises producing the spectral image based at least in part on the quantity of color pixel sensors.

13. The method of claim 10, further comprising:
excluding the quantity of color pixel sensors; and
producing the spectral image comprises producing the spectral image based at least in part on the single infrared pixel sensor.

14. The method of claim 10, further comprising:
directing the visible light and the infrared light to the filter array using one or more lenses.

15. The method of claim 10, further comprising:
producing the infrared light using an infrared light source.

16. The method of claim 10, wherein producing the spectral image comprises producing the spectral image based at least in part on a phase-shift mask coupled to one or more of the filter array or the image sensor.

17. An apparatus, comprising:
means for receiving, from a filter array, visible light and infrared light,
wherein the filter array includes a quantity of color filters to pass the visible light and a quantity of infrared filters to block the visible light and pass the infrared light, and
wherein the quantity of infrared filters is less than the quantity of color filters; and
means for producing, using an image sensor that includes an array of pixel sensors, a spectral image based at least in part on the visible light and the infrared light passed by the filter array,
wherein the array of pixel sensors is approximately 3-by-3 microns, and
wherein the array of pixel sensors includes:
a quantity of color pixel sensors, corresponding to the quantity of color filters, to sense visible light passed from the quantity of color filters, and a quantity of infrared pixel sensors, corresponding to the quantity of infrared filters, to sense infrared light passed from the quantity of infrared filters, and wherein the quantity of infrared pixel sensors includes an infrared pixel sensor that is approximately 1-by-1 microns.

18. The apparatus of claim 17, further comprising:

means for excluding the quantity of infrared pixel sensors; and means for producing the spectral image comprises producing the spectral image based at least in part on the quantity of color pixel sensors.

19. The apparatus of claim 17, further comprising:

means for excluding the quantity of color pixel sensors; and means for producing the spectral image comprises producing the spectral image based at least in part on the quantity of infrared pixel sensors.

20. The apparatus of claim 17, further comprising:

means for directing the visible light and the infrared light to the filter array using one or more lenses.

21. The apparatus of claim 17, further comprising:

means for producing the infrared light using an infrared light source.

22. The apparatus of claim 17, wherein the means for producing the spectral image comprises means for producing the spectral image based at least in part on a phase-shift mask coupled to one or more of the filter array or the image sensor.

23. A device, comprising:

a filter array including a quantity of color filters configured to block infrared light and pass visible light and a quantity of infrared filters configured to block the visible light and pass the infrared light, wherein the quantity of infrared filters is less than the quantity of color filters; and an image sensor including an array of pixel sensors and configured to produce a spectral image based at least in part on the visible light and the infrared light passed by the filter array, wherein the array of pixel sensors is approximately 3-by-3 microns, and wherein the array of pixel sensors includes an infrared pixel sensor that is approximately 1-by-1 microns.

24. The device of claim 23, wherein the quantity of infrared filters is equal to one.

25. The device of claim 23, wherein the quantity of infrared filters includes an infrared filter that is surrounded by a plurality of color filters of the quantity of color filters.

26. The device of claim 23, wherein the quantity of color filters includes a quantity of red light filters, a quantity of green light filters, and a quantity of blue light filters.

27. The device of claim 26, wherein the quantity of green light filters is greater than the quantity of blue light filters.

28. The device of claim 26, wherein the quantity of green light filters is greater than the quantity of red light filters.

29. The device of claim 26, wherein the quantity of green light filters is double at least one of the quantity of blue light filters or the quantity of red light filters.

30. The device of claim 26, wherein the quantity of green light filters is more than double the quantity of infrared filters.

31. The device of claim 23, wherein the image sensor includes a 3-by-3 grid of pixel sensors, wherein the 3-by-3 grid of pixel sensors includes:

the infrared pixel sensor, and a plurality of color pixel sensors, and wherein each of the plurality of color pixel sensors is approximately 1-by-1 microns.

* * * * *